United States Patent
Park et al.

(10) Patent No.: US 8,803,769 B2
(45) Date of Patent: Aug. 12, 2014

(54) DC-DC CONVERTER AND ORGANIC LIGHT EMITTING DISPLAY USING THE SAME

(75) Inventors: Sung-Cheon Park, Yongin (KR); Su-Yeon Yun, Yongin (KR)

(73) Assignee: Samsung Display Co., Ltd., Yongin-si (KR)

(*) Notice: Subject to any disclaimer, the term of this patent is extended or adjusted under 35 U.S.C. 154(b) by 361 days.

(21) Appl. No.: 12/625,512

(22) Filed: Nov. 24, 2009

(65) Prior Publication Data

US 2010/0220039 A1 Sep. 2, 2010

(30) Foreign Application Priority Data

Feb. 27, 2009 (KR) ........................ 10-2009-0016730

(51) Int. Cl.
*G09G 3/30* (2006.01)

(52) U.S. Cl.
USPC ............. 345/76; 345/207; 345/208; 345/209; 345/210; 345/211; 345/212; 307/31; 323/271; 323/274; 323/290; 323/282; 323/283; 323/284; 315/175

(58) Field of Classification Search
USPC ........... 345/76, 77, 82, 204, 208–212, 78, 84, 345/94; 323/271, 274, 282–285, 290; 305/31; 315/175
See application file for complete search history.

(56) References Cited

U.S. PATENT DOCUMENTS

| | | | |
|---|---|---|---|
| 4,186,418 A | 1/1980 | Seiler | |
| 5,808,455 A * | 9/1998 | Schwartz et al. | ............. 323/271 |
| 6,366,474 B1 | 4/2002 | Gucyski | |
| 7,352,162 B1 * | 4/2008 | Chang et al. | ................... 323/290 |
| 7,952,294 B2 * | 5/2011 | Shteynberg et al. | ........... 315/224 |
| 8,115,464 B2 * | 2/2012 | Matsumura | ................... 323/283 |
| 2005/0231133 A1 | 10/2005 | Lys | |

(Continued)

FOREIGN PATENT DOCUMENTS

| | | |
|---|---|---|
| CN | 101231818 A | 7/2008 |
| EP | 1951005 A1 | 7/2008 |

(Continued)

OTHER PUBLICATIONS

JPO Office Action dated Jul. 19, 2011 for JP Application No. 2009-100126 (4 pages).

(Continued)

*Primary Examiner* — Jason Olson
*Assistant Examiner* — Linh N Hoffner
(74) *Attorney, Agent, or Firm* — Christie, Parker & Hale, LLP

(57) ABSTRACT

A DC-DC converter generates a first power and a second power for driving pixels in an organic light emitting display, such that the voltages of the first power and the second power are substantially independent of the voltage from a power supply or a battery. A voltage detector detects the voltage from the power supply, and a booster circuit and an inverter circuit respectively boost and invert the voltage from the power supply to generate and output the first and the second powers, respectively, for the pixels. A PWM controller controls the booster circuit and the inverter circuit to control voltages of the first power and the second power. The booster circuit is adapted to reduce the voltage from the power supply to be lower than the voltage of the first power when the voltage from the power supply detected by the voltage detector is higher than a reference voltage.

9 Claims, 2 Drawing Sheets

(56) References Cited

U.S. PATENT DOCUMENTS

| | | | |
|---|---|---|---|
| 2007/0090820 A1 | 4/2007 | Kodera | |
| 2007/0273306 A1 | 11/2007 | Fujino et al. | |
| 2008/0007234 A1 | 1/2008 | Agari | |
| 2008/0198183 A1* | 8/2008 | Min et al. | 345/691 |
| 2008/0246702 A1* | 10/2008 | Lee et al. | 345/77 |
| 2008/0266216 A1* | 10/2008 | Choi | 345/77 |
| 2009/0295775 A1* | 12/2009 | Kim et al. | 345/212 |

FOREIGN PATENT DOCUMENTS

| | | |
|---|---|---|
| JP | 2002-095243 | 3/2002 |
| JP | 2004-120901 | 4/2004 |
| JP | 2005-080405 | 3/2005 |
| JP | 2008-176306 | 7/2008 |
| JP | 2008-257161 | 10/2008 |
| JP | 2009-284675 | 12/2009 |
| JP | 2010-041909 | 2/2010 |
| KR | 1020020045442 A | 6/2002 |
| KR | 1020020080998 A | 10/2002 |
| KR | 10-2005-0032416 A | 4/2005 |
| KR | 10-2006-0039987 A | 5/2006 |
| KR | 10-2007-0074435 A | 7/2007 |
| KR | 10-2008-0095462 A | 10/2008 |
| WO | WO 2008/155600 A1 | 12/2008 |

OTHER PUBLICATIONS

KIPO Office Action dated Jul. 11, 2011 for KR Application No. 10-2009-0016730 (1 page).

SIPO Office action dated Apr. 26, 2012, for corresponding Chinese Patent application 200910258224.1, (4 pages).

SIPO Patent Gazette dated Aug. 14, 2013, with English translation of cover page, for corresponding Chinese Patent application 200910258224.1, (3 pages).

European Office action dated Nov. 13, 2013, for corresponding European Patent application 10151590.6 (7 pages).

* cited by examiner

DC-DC CONVERTER AND ORGANIC LIGHT EMITTING DISPLAY USING THE SAME

CROSS-REFERENCE TO RELATED APPLICATIONS

This application claims priority to and the benefit of Korean Patent Application No. 10-2009-0016730, filed on Feb. 27, 2009, in the Korean Intellectual Property Office, the entire content of which is incorporated herein by reference.

BACKGROUND

1. Field of the Invention

The present invention relates to a DC-DC converter and an organic light emitting display using the same.

2. Discussion of Related Art

Recently, various flat panel displays having less weight and volume than cathode ray tubes (CRTs) have been developed. Flat panel displays include liquid crystal displays, field emission displays, plasma display devices, organic light emitting displays, etc.

Among others, organic light emitting displays generate images using organic light emitting diodes (OLEDs) that generate light by the recombination of electrons and holes generated corresponding to the flow of current.

Organic light emitting displays have various advantages, e.g., excellent color reproducibility and slimness so that its applications expand to various markets such as cellular phones, PDAs, MP3s, etc.

FIG. 1 is a circuit diagram showing a pixel in a conventional organic light emitting display. Referring to FIG. 1, the pixel is coupled to a data line Dm and a scan line Sn and includes a first transistor T1, a second transistor T2, a capacitor Cst, and an organic light emitting diode OLED.

A source of the first transistor T1 is coupled to a first power supply ELVDD, a drain of the first transistor T1 is coupled to an anode electrode of the organic light emitting diode OLED, and a gate of the first transistor T1 is coupled to a first node N1. A source of the second transistor T2 is coupled to the data line Dm, a drain of the second transistor T2 is coupled to the first node N1, and a gate of the second transistor T2 is coupled to the scan line Sn. A first electrode of the capacitor Cst is coupled to the first power supply ELVDD, and a second electrode of the capacitor Cst is coupled to the first node N1. An anode electrode of the organic light emitting diode OLED is coupled to the drain of the first transistor T1 and a cathode electrode of the organic light emitting diode OLED is coupled to a second power supply ELVSS.

The voltage at the first node N1 of the pixel as described above is determined according to a data signal transferred through the data line Dm, and the first transistor T1 of the pixel drives a current from the first power supply ELVDD to the second power supply ELVSS according to the voltage of the first node N1. The organic light emitting diode OLED emits light according to the operation of the pixel, and a current having a magnitude represented by the following equation 1 flows through the organic light emitting diode OLED.

$$I_{oled} = \frac{\beta}{2}(V_{GS} - V_{th})^2 = \frac{\beta}{2}(V_{data} - ELVDD - V_{th})^2 \quad \text{[Equation 1]}$$

Here, $I_{oled}$ represents the current flowing through the organic light emitting diode, $V_{GS}$ represents the voltage between the gate and source of the first transistor T1, $V_{th}$ represents the threshold voltage of the first transistor T1, $V_{data}$ represents the voltage of the data signal, and ELVDD represents the voltage of the first power.

The organic light emitting display having the pixel as described above operates by receiving a power supply from a battery. Therefore, in order to extend a use time of the organic light emitting display, the battery may be desired to have a larger capacity. If the capacity of the battery becomes larger, the voltage of the power supply output from the battery may become higher.

The first power ELVDD and the second power ELVSS transferred to the pixel are generated by receiving the power supply from a DC-DC converter that includes a booster circuit and an inverter circuit. However, in a conventional booster circuit, the boosting range of the voltage has been limited. For example, in a case where the first power supply ELVDD has a voltage of 4.6V, if the input voltage is between 2.9V and 4.2V, the booster circuit generates a voltage of 4.6V. However, if the input voltage is 4.2V or higher, the booster circuit may generate a voltage higher than 4.6V.

Therefore, in the related art, the first power ELVDD has a voltage of 4.6V or higher, and thus a battery having a large capacity cannot be adopted.

SUMMARY OF THE INVENTION

One aspect of the present invention provides a DC-DC converter that generates voltage of a first power supply so that current flows through an organic light emitting diode irrespective of a power supply voltage from a battery, and an organic light emitting display using the same.

According to one aspect of an embodiment of the present invention, a DC-DC converter includes a voltage detector for detecting a voltage from a power supply, a booster circuit for receiving and boosting the voltage from the power supply to generate and output a first power, an inverter circuit for receiving and inverting the voltage from the power supply generate and output a second power, and a PWM controller for controlling the booster circuit and the inverter circuit to control voltages of the first power and the second power, adapted for reducing the voltage from the power supply to be lower than the voltage of the first power when the voltage from the power supply detected by the voltage detector is higher than a reference voltage.

An aspect according to an embodiment of the present invention provides an organic light emitting display including a pixel, a data driver, a scan driver, and a DC-DC converter. The pixel displays an image corresponding to data signals, scan signals, a first power, and a second power. The data driver generates and outputs the data signals; the scan driver generates and outputs the scan signals; and the DC-DC converter generates and outputs the first power and the second power. The DC-DC converter includes a voltage detector, a booster circuit, an inverter circuit, and a PWM controller. The voltage detector detects a voltage from a power supply. The booster circuit receives and boosts the voltage from the power supply to generate and output the first power. The inverter circuit receives and inverts the voltage from the power supply to generate and output the second power. The PWM controller controls the booster circuit and the inverter circuit to control respective voltages of the first power and the second power, adapted for reducing the voltage from the power supply to be lower than a voltage of the first power when the voltage from the power supply detected by the voltage detector is higher than a reference voltage.

With the DC-DC converter and the organic light emitting display using the same according to exemplary embodiments of the present invention, the voltage from the power supply output from the battery can be set to be high, making it possible to utilize a high-capacity battery. Therefore, the use time of the organic light emitting display can be extended.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
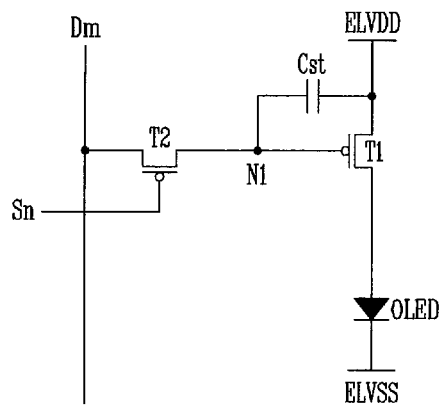
FIG. 1 is a circuit diagram showing a conventional pixel circuit adapted for an organic light emitting display.

Hereinafter, certain exemplary embodiments according to the present invention will be described with reference to the accompanying drawings. Here, when a first element is described as being coupled to a second element, the first element may be directly coupled to the second element or indirectly coupled to the second element via a third element. Further, some of the elements that are not essential to the complete understanding of the invention are omitted for clarity. Also, like reference numerals refer to like elements throughout.

Figure 2:
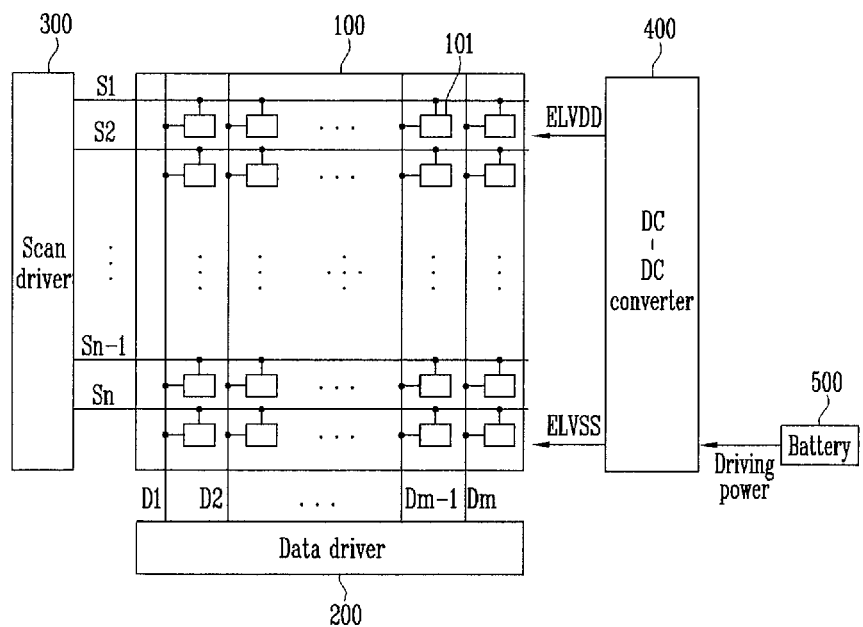
FIG. 2 is a block diagram of an organic light emitting display according to an exemplary embodiment of the present invention.

FIG. 2 is a block diagram of an organic light emitting display according to an exemplary embodiment of the present invention. Referring to FIG. 2, the organic light emitting display includes a display region 100, a data driver 200, a scan driver 300, a DC-DC converter 400, and a battery 500.

The display region 100 includes a plurality of pixels 101, wherein each pixel 101 includes an organic light emitting diode for emitting light corresponding to a flow of current. The display region 100 includes n scan lines S1, S2, ..., Sn−1 and Sn extending in a row direction for transferring scan signals, and m data lines D1, D2, ..., Dm−1 and Dm extending in a column direction for transferring data signals.

The display region 100 is driven by receiving a first power ELVDD and a second power ELVSS from the DC-DC converter 400. Therefore, the display region 100 generates currents to flow through the organic light emitting diodes in accordance with the scan signals, the data signals, the first power ELVDD, and the second power ELVSS to emit light, thereby displaying an image.

The data driver 200 generates data signals in accordance with image signals having red, blue, and green components. The data driver 200 applies the data signals to the display region 100 through the data lines D1, D2, ..., Dm−1, and Dm.

The scan driver 300 is coupled to the scan lines S1, S2, ..., Sn−1, and Sn to transfer the scan signals that it generates to specific rows of the display region 100. The pixels 101, input with the scan signals, receive the data signals output from the data driver 200, and thus, the voltages corresponding to the data signals are transferred to the pixels 101.

The DC-DC converter 400 receives a power supply from the battery 500 to generate the first power ELVDD and the second power ELVSS. The DC-DC converter 400 includes a booster circuit and an inverter circuit, wherein the booster circuit boosts the voltage of the power supply to generate the first power ELVDD and the inverter circuit inverts the voltage of the power supply to generate the second power ELVSS.

A conventional booster circuit can boost a low voltage to a high voltage but cannot reduce a high voltage to a low voltage. Therefore, when the voltage of the power supply output from the battery 500 is higher than the first power ELVDD generated from the booster circuit, such a booster circuit cannot be used. Therefore, in order that the booster circuit can also be utilized with a high-capacity battery having a power supply with a relatively high voltage, the booster circuit according to an exemplary embodiment of the present invention is operated in the following cases: a case where the voltage of the power supply output from the battery is lower than the voltage of the first power ELVDD; and a case where the voltage of the power supply output from the battery is higher than the voltage of the first power ELVDD.

Therefore, the booster circuit generates the first power ELVDD having substantially the same voltage, substantially irrespective of the voltage of the power supply. The operation of the booster circuit according to an exemplary embodiment of the invention will be described in detail with reference to FIGS. 3 and 4.

The voltage of the second power ELVSS generated by the inverter circuit is a voltage that allows the organic light emitting diode to be driven in a saturation region, wherein the saturation region may be changed according to the materials utilized for an organic film of the organic light emitting diode and the properties of the transistor. Therefore, in order that a desired image can be sufficiently expressed even under unfavorable conditions, the voltage of the second power ELVSS is designed to have a voltage level margin of about 2 to 3V when designing the organic light emitting display.

The battery 500 holds a charge corresponding to the power supply and transfers the charged power to the DC-DC converter 400, thereby allowing the DC-DC converter 400 to generate the first power ELVDD and the second power ELVSS.

Figure 3:
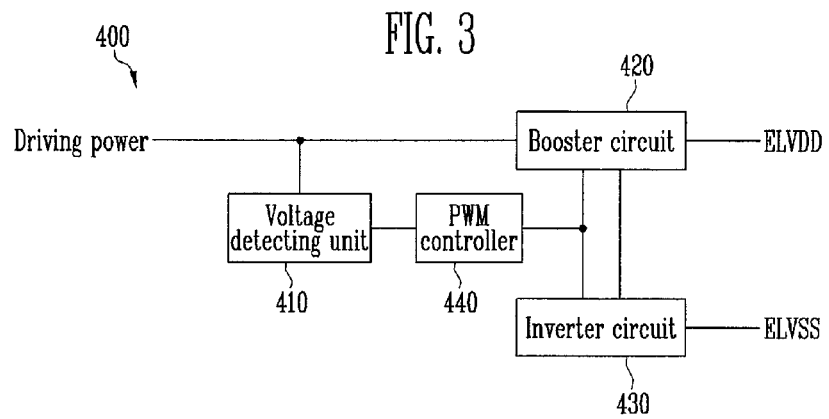
FIG. 3 is a block diagram of a DC-DC converter according to an exemplary embodiment of the present invention.

FIG. 3 is a block diagram showing a DC-DC converter according to an exemplary embodiment of the present invention. Referring to FIG. 3, the DC-DC converter 400 includes a voltage detecting unit 410, a booster circuit 420, an inverter circuit 430, and a pulse width modulation (PWM) controller 440.

The voltage detecting unit 410 receives and measures the voltage of the power supply.

The booster circuit 420 boosts the voltage of the power supply output from the battery 500 to generate the first power ELVDD.

The inverter circuit 430 inverts the voltage of the power supply output from the battery 500 to generate the second power ELVSS.

The PWM controller 440 outputs a control signal whose pulse width is varied to control the booster circuit 420 and the inverter circuit 430, thereby generating the first power ELVDD and the second power ELVSS.

However, when the voltage from the power supply detected by the voltage detecting unit 410 is higher than a reference voltage (e.g., a predetermined voltage), the PWM controller 440 outputs the control signal that controls the voltage of the power supply to be lower than the voltage of the first power ELVDD by dropping the voltage from the power supply. In other words, the PWM controller 440 controls the pulse width of the control signal in accordance with the voltage of the power supply.

The booster circuit 420 performs different operations when the voltage detected by the voltage detecting unit 410 is higher than the voltage of the first power ELVDD as opposed to when the voltage detected by the voltage detecting unit 410 is lower than the voltage of the first power ELVDD, so that the booster circuit can operate normally.

First, when the voltage from the power supply detected by the voltage detecting unit 410 is higher than the voltage of the first power ELVDD, the booster circuit 420 reduces the voltage from the power supply to be lower than the first power ELVDD and then boosts the reduced voltage using the control signal. At this time, the reduced voltage is lower than the voltage from the first power so that the remaining portions of the booster circuit 420 can be operated normally.

When the voltage of the power supply detected by the voltage detecting unit 410 is lower than the voltage of the first power ELVDD, the booster circuit 420 can be operated normally. That is, the booster circuit 420 can boost the voltage from the power supply using the control signal.

Therefore, the booster circuit 420 can generate the voltage from the first power ELVDD, substantially irrespective of the voltage from the power supply.

The inverter circuit 430 receives and inverts the power supply output from the battery and then makes the absolute value of the voltage high, thereby generating the second power ELVSS.

Figure 4:
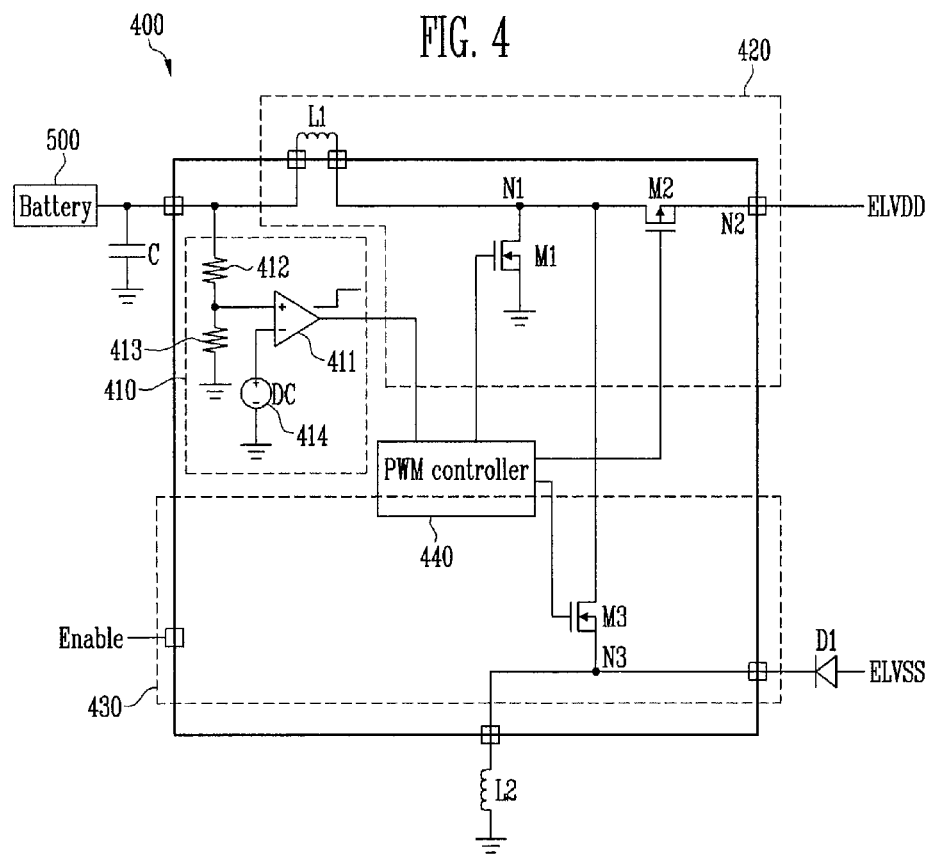
FIG. 4 is a circuit diagram showing further details of the DC-DC converter of FIG. 3.

FIG. 4 is a circuit diagram showing an example of the DC-DC converter of FIG. 3. With reference to FIG. 4, the description that follows will make reference to the voltage of the power supply generally output from the battery 500 and the voltage of the first power ELVDD. Referring to FIG. 4, the DC-DC converter 400 includes a capacitor C that is coupled between a power input terminal and the battery 500 to charge the voltage of the power supply, a first inductor L1 (e.g., a coil) having one terminal coupled to the capacitor C and the other terminal coupled to a first node N1, a voltage detecting unit 410 that is coupled to the capacitor C to measure the voltage of the power supply, a PWM controller 440 that outputs control signals whose pulse widths are controlled corresponding to a voltage sensing signal output from the voltage detecting unit 410, a first switching device M1 having a first electrode coupled to the first node N1, a second electrode coupled to a ground, and a gate that receives a first control signal output from the PWM controller 440, a second switching device M2 having a first electrode coupled to the first node N1, a second electrode coupled to a second node N2, and a gate that receives a second control signal output from the PWM controller 440, a third switching device M3 having a first electrode coupled to the first node N1, a second electrode coupled to a third node N3, and a gate that receives a third control signal output from the PWM controller 440, a second inductor L2 (e.g., a coil) having one terminal coupled to the third node N3 and the other terminal coupled to the ground, and a diode D1 having a cathode electrode coupled to the third node N3. Also, the first to third switching devices M1-M3 are MOSFET devices, wherein if the first electrode is the source, the second electrode is the drain, and if the first electrode is the drain, the second electrode is the source. In the illustrated embodiment, the first switching device M1 and the third switching device M3 are n-channel devices, and the second switching device M2 is a p-channel device. However, the present invention is not limited thereto.

The voltage detecting unit 410 includes a comparator 411, a pair of resistors 412 and 413 forming a voltage divider, and a reference voltage source 414. The comparator 411 receives a reference voltage from the reference voltage source 414 in its inverting input. The reference voltage source may be coupled to the first power ELVDD, or may be a separate voltage source. The resistors 412 and 413 divide the power supply voltage from the battery 500, and the divided voltage is received at the non-inverting input of the comparator 411. Thus, the comparator compares the divided voltage with that of the reference voltage, and if the divided voltage, which corresponds to the power supply voltage, is higher than the reference voltage, the comparator sends an output signal having a high level to the PWM controller 440. On the other hand, if the divided voltage is lower than the reference voltage, the comparator sends an output signal having a low level to the PWM controller 440.

According to an exemplary embodiment, the booster circuit is adapted to boost the voltage of the power supply, which may be in a range from 2.9 to 4.2V, to generate the voltage of the first power ELVDD to have a voltage of 4.6V. Hereinafter, the operation of the DC-DC converter 400 will be described according to two cases: a case where the voltage of the power supply output from the battery 500 is 2.9 to 4.2V, and a case where the voltage of the power supply output from the battery 500 is in a range of about 4.2V to 4.8V.

First, the case where the voltage of the power supply output from the battery 500 is 2.9 to 4.2V will be described. If the first switching device M1 is turned on and the second switching device M2 is turned off by the PWM controller 440, the power supply output from the battery 500 flows to the ground through the first switching device M1. When a current flows through the first inductor L1 to the first switching device M1, energy is stored in the first inductor L1 in the form of a first voltage that interferes with the current flowing through the first inductor L1. When the first switching device M1 is turned off, the second switching device M2 is turned on so that the energy stored in the first inductor L1 is transferred as a voltage through the second switching device M2 to the second node N2. At this time, the magnitude of the first voltage of the first inductor L1 is controlled according to the pulse width of the first control signal output from the PWM controller 440 for switching the first switching device M1. Therefore, as the pulse width of the first control signal is controlled, the voltage output to the second node N2 is controlled (e.g., it has a predetermined magnitude).

The case where the voltage of the power supply output from the battery 500 is in the range of about 4.2V to 4.8V will now be described. The second switching device M2 is always turned off by the PWM controller 440. According to an exemplary embodiment, the second switching device M2 has a parasitic body diode coupled between its source and its drain. Thus, when the second switching device M2 is turned off, the second switching device M2 has a connection in the form of a diode whose anode electrode is coupled to the first node N1 and cathode electrode is coupled to the second node N2. The diode formed by the second switching device M2 has a forward-bias voltage of about 0.7V. Here, when the first switching device M1 is turned on, the second switching device M2 that is diode-connected becomes biased in a reverse direction and current flows from the first node N1 to the ground direction through the first switching device M1, thereby generating the first voltage from the first inductor L1. When the first switching device M1 is turned off, the second switching device M2 becomes biased in a forward direction so that energy stored in the first inductor L1 is output as a voltage to the second node N2, thereby facilitating the generation of an ELVDD voltage of 4.6V.

The third switching device M3 performs turn-on and turn-off operations in accordance with the third control signal from the PWM controller 440. By the turn-on and turn-off operations of the third switching device M3, a second voltage is generated across the second inductor L2. The second voltage is generated in a direction tending to prevent a current from flowing through the second inductor L2, so that a power having a negative voltage is output by the second inductor L2 through the third node N3. Therefore, the second power ELVSS is generated and output.

The diode D1 illustrated outside the DC-DC converter 400 reduces or prevents an inflow of current from the output terminal of the second power supply ELVSS.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A DC-DC converter, comprising:
    a voltage detector for detecting a voltage from a power supply;
    a booster circuit for receiving and boosting the voltage from the power supply to generate and output a first power;
    an inverter circuit for receiving and inverting the voltage from the power supply to generate and output a second power; and
    a pulse width modulation (PWM) controller for controlling the booster circuit and the inverter circuit to control voltages of the first power and the second power, adapted for reducing the voltage from the power supply to be lower than the voltage of the first power when the voltage from the power supply detected by the voltage detector is higher than a reference voltage,
    wherein the PWM controller is configured to output a control signal for controlling the booster circuit and the inverter circuit, and to control a pulse width of the control signal in accordance with the voltage from the power supply, and
    wherein the booster circuit comprises:
    a first inductor coupled to the power supply;
    a first switch having a turn-on or turn off state determined in accordance with the control signal, a first electrode coupled to a first node and a second electrode coupled to a ground such that the first inductor is charged with a first voltage in accordance with the turn-on or turn-off state; and
    a second switch having a turn-on or turn off state determined in accordance with the control signal, a first electrode coupled to the first node and a second electrode coupled to an output terminal of the booster circuit.

2. The DC-DC converter as claimed in claim 1, wherein when the second switch is turned off, it is configured to function as a diode such that the voltage of the power supply drops by a forward-bias voltage of the diode.

3. The DC-DC converter as claimed in claim 1, wherein the second switch is adapted to reduce the voltage of the power supply in accordance with a resistance between the first and second electrodes of the second switch in the turn-on state.

4. The DC-DC converter as claimed in claim 1, wherein the inverter circuit comprises:
    a third switch having a turn-on or a turn-off state determined in accordance with the control signal, a first electrode coupled to the first node and a second electrode coupled to a second node, the third switch for switching the power supply transferred through the first inductor;
    a second inductor for charging a second voltage utilizing the voltage of the power supply transferred through the first inductor by transferring or blocking the voltage of the power supply according to a switching operation of the third switch; and
    a diode coupled to the output terminal of the booster circuit to pass the voltage charged in the second inductor to the second power, and to block the second power from being transferred to the second inductor.

5. An organic light emitting display, comprising:
    a display region for displaying an image corresponding to data signals, scan signals, a first power and a second power;
    a data driver for generating and outputting the data signals;
    a scan driver for generating and outputting the scan signals; and
    a DC-DC converter for generating and outputting the first power and the second power, wherein the DC-DC converter comprises:
    a voltage detector for detecting a voltage from a power supply;
    a booster circuit for receiving and boosting the voltage from the power supply to generate and output the first power;
    an inverter circuit for receiving and inverting the voltage from the power supply to generate and output the second power; and
    a pulse width modulation (PWM) controller for controlling the booster circuit and the inverter circuit to control voltages of the first power and the second power, adapted for reducing the voltage from the power supply to be lower than the voltage of the first power when the voltage from the power supply detected by the voltage detector is higher than a reference voltage,
    wherein the PWM controller is configured to output a control signal for controlling the booster circuit and the inverter circuit, and to control a pulse width of the control signal in accordance with the voltage from the power supply, and
    wherein the booster circuit comprises:
    a first inductor coupled to the power supply;
    a first switch having a turn-on or a turn off state determined in accordance with the control signal, a first electrode coupled to a first node and a second electrode coupled to a ground such that the first inductor is charged with a first voltage in accordance with the turn-on or turn-off state; and
    a second switch having a turn-on or turn off state determined in accordance with the control signal, a first electrode coupled to the first node and a second electrode coupled to an output terminal of the booster circuit.

6. The organic light emitting display as claimed in claim 5, wherein when the second switch is turned off, it is configured to function as a diode such that the voltage of the power supply drops by a forward-bias voltage of the diode.

7. The organic light emitting display as claimed in claim 5, wherein the second switch is adapted to reduce the voltage of the power supply in accordance with a resistance between the first and second electrodes of the second switch in the turn-on state.

8. The organic light emitting display as claimed in claim 5, wherein the inverter circuit comprises:
    a third switch having a turn-on or a turn-off state determined in accordance with the control signal, a first electrode coupled to the first node and a second electrode coupled to a second node, the third switch for switching the power supply transferred through the first inductor;

a second inductor for charging a second voltage utilizing the voltage of the power supply transferred through the first inductor by transferring or blocking the voltage of the power supply according to a switching operation of the third switch; and a diode coupled to the output terminal of the booster circuit to pass the voltage charged in the second inductor to the second power, and to block the second power from being transferred to the second inductor.

9. A DC-DC converter comprising:

a voltage detector configured to detect a voltage from a power supply, configured to divide the voltage from the power supply, configured to measure the divided voltage, and comprising a first resistor and a second resistor between the power supply and ground;

a booster circuit for receiving and boosting the voltage from the power supply to generate and output a first power;

an inverter circuit for receiving and inverting the voltage from the power supply to generate and output a second power; and a pulse width modulation (PWM) controller for controlling the booster circuit and the inverter circuit to control voltages of the first power and the second power, adapted for reducing the voltage from the power supply to be lower than the voltage of the first power when the voltage from the power supply detected by the voltage detector is higher than a reference voltage, and configured to output a control signal whose pulse width is varied to control the booster circuit and the inverter circuit, thereby generating the first power and the second power.

* * * * *